United States Patent [19]

Holland et al.

[11] 4,321,471

[45] Mar. 23, 1982

[54] X-RAY TARGET MONITOR

[75] Inventors: William P. Holland, West Redding; Anthony Pellegrino, New Fairfield, both of Conn.

[73] Assignee: The Machlett Laboratories, Inc., Stamford, Conn.

[21] Appl. No.: 118,144

[22] Filed: Feb. 4, 1980

[51] Int. Cl.[3] .............................................. G03B 41/16

[52] U.S. Cl. ..................................... 250/406; 250/402

[58] Field of Search ........................ 250/406, 402, 401

[56] References Cited

U.S. PATENT DOCUMENTS 3,205,360 9/1965 Graves .

3,917,949 11/1975 Winkler .

3,940,625 2/1976 Hounsfield .......................... 250/406

3,963,930 6/1976 Fiocca .

*Primary Examiner*—Craig E. Church

*Attorney, Agent, or Firm*—John T. Meaney; Joseph D. Pannone; Richard M. Sharkansky

[57] ABSTRACT

A source of X-rays encompassing a rotating target is provided with a detector of X-rays located outside a port of a housing of the source and positioned at or near a tangent line to the radiating surface for observing variations in the radiation intensity due to rotation of the target, the variations being pronounced due to the heel effect of the radiation pattern. In one embodiment, the X-ray detector employs a scintillation material and is coupled by a light pipe to a photodetector which is removed from the path of the radiation and detects scintillations of the X-ray detector. Alternatively, the photodetector and light pipe may be deleted by the use of a detector of germanium, silicon or an ion chamber which converts X-ray photons directly to an electric current.

16 Claims, 10 Drawing Figures

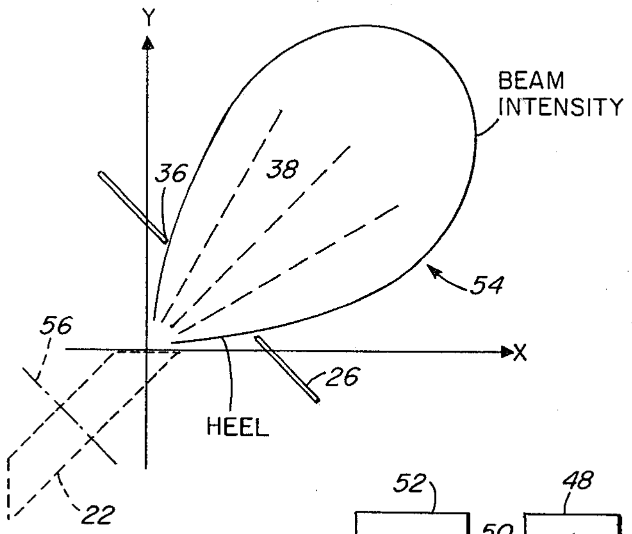
FIG. 2A
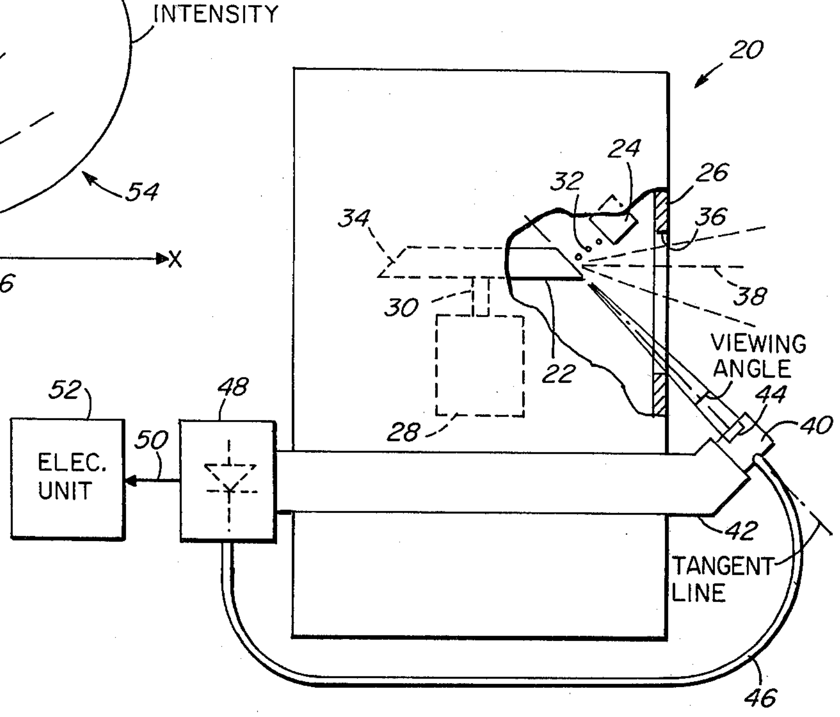
FIG. 1
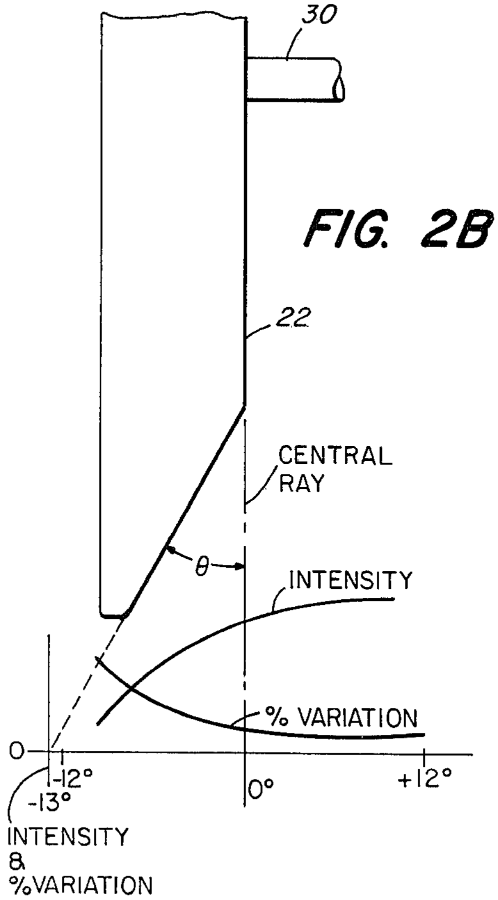
FIG. 2B
| θ DEG. | % INT. | % VAR. |
|---|---|---|
| +10 | 110 | 0.5 |
| 0 | 100 | 1.5 |
| -10 | 38 | 36 |
FIG. 2C

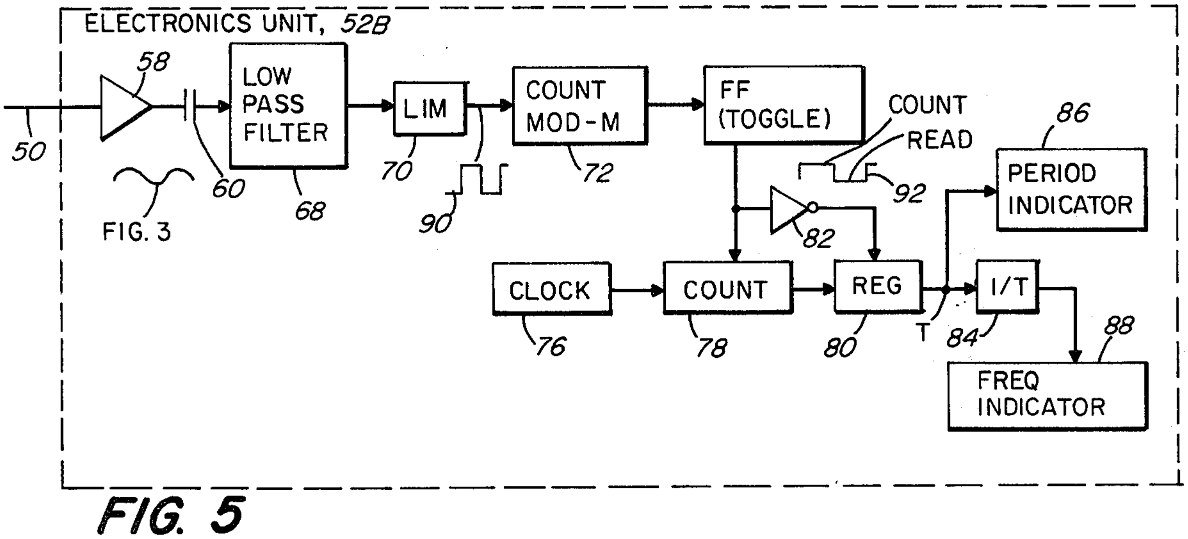
FIG. 5
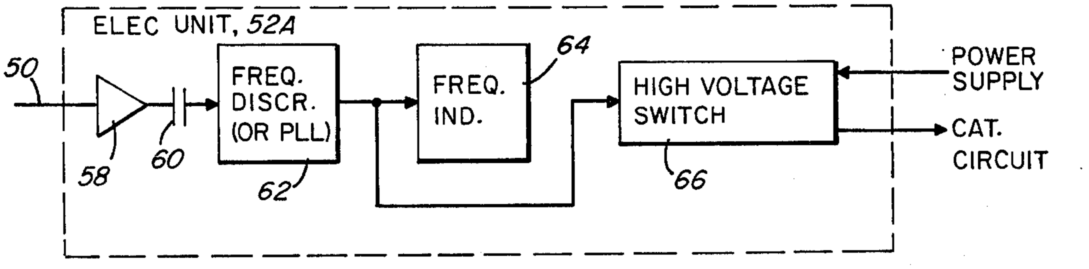
FIG. 4
FIG. 6
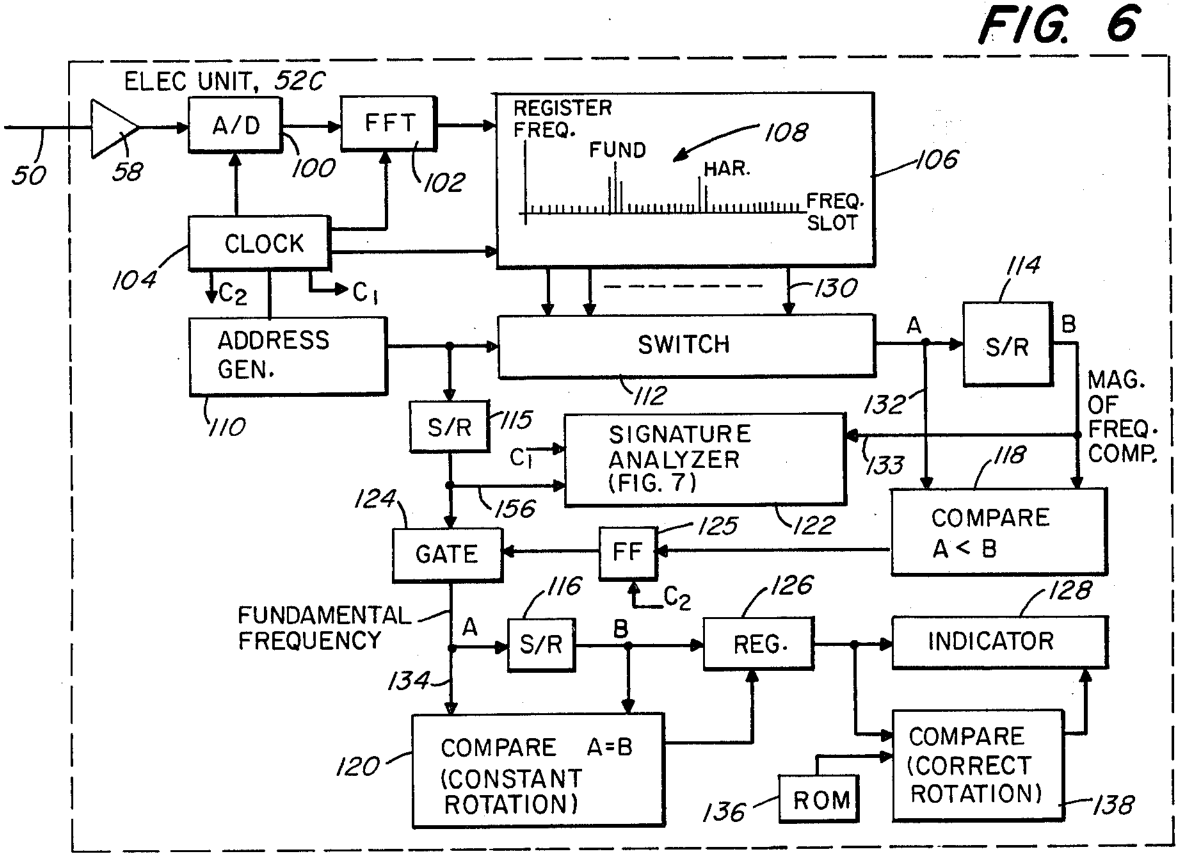

X-RAY TARGET MONITOR

BACKGROUND OF THE INVENTION

This invention relates to X-ray sources and, more particularly, to a monitoring of the speed of rotation of a target and the aging of a radiation surface thereof.

X-ray sources, such as those utilized in the field of medicine for the imaging of subjects, frequently employ a rotating target bombarded by a beam of electrons from a cathode. The beam of electrons is directed to a focal track on an inclined surface of the target from which X-radiation radiates in response to the impingement of the electrons upon the radiating surface. The surface from which the radiation radiates may be referred to hereinafter as the radiating surface. Rotation of the target past the electron beam distributes the heat induced by the beam along the entire focal track thereby preventing the build up of excessive heat at any one point on the target. The distribution of the heat along the focal track allows relatively higher power densities of the X-radiation as compared to the power density attainable with a stationary target.

A problem arises in the operation of such X-ray sources in that knowledge of the speed of rotation of the target is not readily available without the use of some sort of detector of the speed of rotation. The rotation data may be utilized for determining when the power is to be increased in the anode-cathode circuit. Unfortunately, devices which measure shaft angle rotation, such as the rotation of the shaft upon which the target is mounted, require the installation of an optical, mechanical or electrically responsive device along the shaft itself which, in the case of an X-ray source, would necessitate an invasion of the housing of the source in order to install such a detection device. The application of the power is preferably delayed until the rotation of the target has attained the desired rate. In addition, the rotational data may be employed to insure that the source is not operated at the rotational speed of a mechanical resonance of the target and the rotor of its drive motor. Also, the foregoing rotation measurement devices fail to provide any data as to the condition of the radiating surface of the target.

SUMMARY OF THE INVENTION

The aforementioned problems are overcome and other advantages are provided by an X-ray target monitoring system which, in accordance with the invention, is totally contained outside the housing of the X-ray source so as to provide a noninvasive monitoring of the target. An X-ray scintillator serves as a detector of the radiation, and is positioned adjacent the radiation exit port of the housing along a line tangent to the radiating surface of the target. The portion of the radiation propagating generally along the tangent line is often referred to as the heel effect, and is characterized by substantially reduced intensity as compared to the central portion of the radiation pattern. The placement of the X-ray detector within the heel of the radiation pattern militates against any blockage of the central portion of the X-radiation field which may be utilized, for example, for forming an image of a subject.

A feature of the invention is found in the placement of the X-ray detector within the path of rays of radiation lying generally along the tangent to the radiating surface to utilize the heel effect for increased sensitivity to variations in the radiation pattern resulting from rotation of the target and from aging of the target. It has been found that, even with a well balanced assembly of the target and the rotor of the motor, the rotation of the target and rotor within the housing results in a measurable perturbation of the radiation pattern. Such perturbations are believed to be due to deviations in the radiation surface from a perfect symmetry about the rotor axis, as well as a small misalignment of the axis of the target with the axes of the rotor and the shaft coupling the target to the rotor. Since the intensity of the radiation drops to zero or near-zero for radiant energy propagating along a tangent to the radiating surface, this being the heel ffects, any of the foregoing perturbations in the alignment of the axis or of irregularities in the radiating surface provide large pulsations in the intensity of the radiation upon rotation of the target. The X-ray detector is preferably located to view an angle including a small region immediately above and below the tangent to the target radiating surface for sensing the foregoing pulsations of intensity in the radiation pattern, the pulsations being periodic with each rotation of the target.

The scintillations of the X-ray detector are coupled via a light pipe to a photodetector which is located at a position remote from the radiation so as to protect the photodetector, typically a semiconductor diode, from the radiation. The photodetector is coupled to an electronics unit which includes circuitry for the detection of the frequency of a pulsating electric signal produced by the photodetector in response to pulsations of the scintillations of the detector, the latter being proportional to the pulsations in intensity of the radiation in the heel of the radiation pattern. The frequency detection circuitry may take the form of an analog discriminator circuit, or a digital counting circuit which counts the interval of time over the duration of a period or a set of periods, of the target rotation.

The foregoing pulsations in the scintillations of the detector and in the corresponding electric signal of the photodetector have been found to have a generally sinusoidal type of waveform which is periodic with each period of rotation of the target. However, it is recognized that the pitting or melting of the target surface can produce a substantially step-wise discontinuity in the waveform of the photodetector signal, the step-wise discontinuity being of short duration relative to the period of rotation. Accordingly, there is provided, within a further embodiment of the electronics unit, an electrical circuit employing a sampling of the photodetector signal by an analog-to-digital converter, the sampling being followed by a fast-fourier-transformer (FFT), a selectron circuit and a signature analyzer circuit. The FFT provides a set of spectral lines within a register, the lines stored within the register being periodically spaced because of the substantially constant rate of target rotation, the lines appearing at harmonic frequencies of a fundamental line due to perturbations from the substantially sinusoidal waveform associated with a smooth target. The selection circuit compares the amplitudes of the various spectral lines to obtain the line corresponding to the fundamental frequency of the spectrum, this being the frequency of rotation of the target. The signature analyzer circuit includes a memory storing a model target spectrum for a specific speed of rotation, a scaler for scaling the spectral data of the memory to conform with the actual speed of target rotation, and a correlator for correlating the scaled model spectrum with the spectrum provided by the FFT to indicate the condition of the radiating surface.

BRIEF DESCRIPTION OF THE DRAWINGS

The aforementioned aspects and the features of the invention are explained in the following description taken in connection with the accompanying drawings wherein:

FIG. 1 shows an elevation view of an X-ray source with a radiation detector secured to a housing thereof in accordance with the invention, a portion of the housing being cut away to show a cathode, a target, and a radiation port permitting viewing of the target along a tangent line thereto in accordance with the invention, an electronics unit of the invention being indicated diagrammatically;

FIG. 2 A–2C depict the pattern of intensity of a beam of radiation;

FIG. 4 is a block diagram of an embodiment of the electronics unit of FIG. 1 employing analog circuitry in the form of a frequency discriminator, or phase locked loop, for measuring the frequency of the signals depicted in FIG. 3 and, hence, the rotation of the target of FIG. 1;

FIG. 5 is an alternative embodiment of the electronics unit employing a limiting of the amplitude of the detector signal to provide a substantially square wave signal, and counters for counting the duration of a period of the signal;

FIG. 6 is a block diagram of an alternative embodiment of the electronics unit of FIG. 1 employing a fast-Fourier-transformer to provide a spectral analysis of the waveforms of FIG. 3 for measuring the rotational speed of the target and, via a signature analyzer, a comparison of the spectrum with a reference spectrum to determine the condition of a radiating surface of the target in accordance with the invention.

DESCRIPTION OF THE PREFERRED EMBODIMENT

Figure 3:
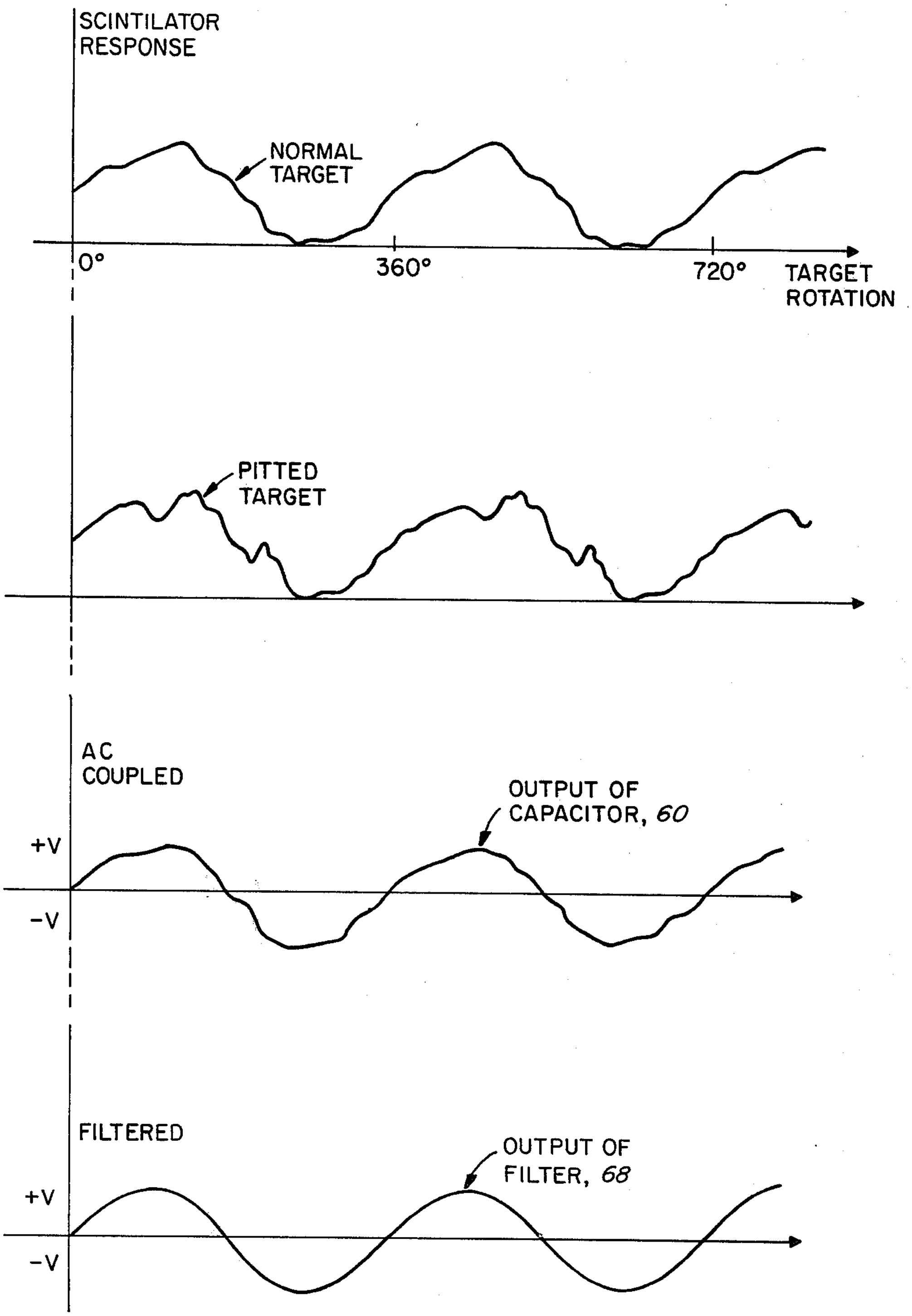
FIG. 3 is a set of graphs of which the first two graphs show the signal of a scintillator of the detector of FIG. 1 in response to a normal target and to a pitted target, the bottom two graphs of FIG. 3 showing the capacitive coupling and filtering of the scintillator signal for the normal target.

Referring now to FIG. 1, there is seen an X-ray source 20 comprising a target 22 and a cathode 24 which are partially seen through a cut away portion of a housing 26 of the source 20, the remaining portion of the target 22 and the cathode 24 being shown in dotted lines. The rotor of a motor 28 is coupled via a shaft 30 to the target 22 for rotating the target 22 as a beam of electrons 32 is directed by the cathode 24 towards the radiating surface 34 of the target 22. A port 36 is provided in the side of the housing 26 adjacent the target 22 to permit the passage of a cone of X-rays 38 from the target 22.

In accordance with the invention, a target monitoring system includes an X-ray detector 40 secured by an exemplary bracket 42 to the housing 26, the detector 40 being located along a tangent to the radiating surface 34 and with the port 36 being so positioned so as to provide a line of view from the detector 40 to the target 22. The detector 40 comprises scintillation material such as sodium iodide. The face 44 of the detector 40, by which the scintillation material is illuminated with the rays 38, has a cross-sectional dimension in the range of typically three millimeters to five millimeters, the face 44 subtending a relatively small viewing angle, as compared to the cone angle of the cone of radiation of the rays 38, for viewing rays 38 in the vicinity of the tangent line at the heel of the radiation pattern. Scintillations of light produced by the scintillation material in response to incident X-ray photons are coupled via an optical pipe 46, which may be a fiber optic conductor, to a photodetector 48. The photodetector 48 typically comprises a semiconductor diode for converting light in the pipe 46 to an electrical signal which is coupled via line 50 to an electronics unit 52.

Referring also to FIG. 2, the graph 54 shows the intensity of the beam of X-rays 38 as a function of the polar angle between the X and the Y coordinate axes, the center of the coordinate axes being located at the point of impingement of electrons 32 upon the target 22. The edges of the beam of rays 38 are seen to be defined by the X axis, which coincides with the tangent of FIG. 1, and an edge of the port 36. It is noted that for radiation directed at a relatively small angle from the X axis, the beam intensity increases rapidly as a function of angular displacement from the X axis. Thus, any angular displacement of the rotation axis 56 of the target 22 relative to the central axis of the housing 20, as may occur in the case of a mechanical resonance during the rotation of the target 22, would result in a periodic angular offset of the tangent line of the target 22 relative to the face 44 of the detector 40 with a resultant modulation of the beam intensity as viewed by the detector 40.

While the radiation intensity varies substantially at the heel of the pattern, the intensity of the beam is relatively constant in the mid-portion of the beam pattern so that small perturbations in the radiating surface 22 or in its alignment relative to the housing 20 would generally have little effect on an image which would be obtained by radiating a subject and an X-ray film plate by the rays 38. It should be noted, however, that even such relatively small variations in the intensity of the midpoint of the beam pattern become noticeable in tomographic imaging systems such as, by way of example, a computerized axial tomographic (CAT) scanner.

Referring also to FIG. 3, the upper graph shows a substantially sinusoidally shaped waveform of a signal provided on line 50 by the photodetector 48 in response to radiation received by the X-ray detector 40 as a function of the angular position of the target 22 about its axis 56. Variations from a true sinusoidal waveform have been exaggerated in the first graph to show the effects of perturbations in the radiating surface 34 and of misalignment of the axis 56 relative to the motor 28 in the case of a normal target. In the second graph, positive and negative perturbations have been introduced to show the effect on the intensity of radiation as viewed along the tangent in the case of the impingement upon a pitted area of the target 22 by the electrons 32.

Referring also to FIG. 4, an embodiment of the electronics unit 52 of FIG. 1 is portrayed, the embodiment of FIG. 4 being identified by the legend 52A. The electronics unit 52A is seen to comprise a preamplifier 58 which is coupled via a capacitor 60 to an analog discriminator 62. The analog circuit of the discriminator 62 may comprise a tuned circuit of inductors and capacitors (not shown) as is well known, or a phase locked loop (PLL, not shown) which, as is well known, tracks the frequency of a periodic signal such as a sinusoid. The output signal of the discriminator 62 is applied to an indicator 64 which displays the value of the frequency, and to an exemplary switch 66 which may be utilized for applying high voltage from a power a power supply (not shown) to the circuit of the target 22 and cathode 24 so that the full current of the electrons 32 is not directed upon the target 22 until after the target 22 reaches its proper speed of rotation. A small electron current is applied to the target 22 initially sufficient radiation to permit measurement of the rotation. The threshold of the signal magnitude required to operate the switch 66 is sufficiently high so that the switch 66 is not operated in response to the presence of a harmonic of the fundamental frequency of rotation.

In operation, therefore, a signal on line 50 is amplified by the amplifier 58, converted by the capacitor 60 to an AC (alternating current) signal as is portrayed in the third of the graphs in FIG. 3, and coupled to the discriminator 62 which provides an output voltage proportional to the fundamental frequency of the waveform of the third graph of FIG. 3. Since the waveform is periodic with each increment of 360 degrees of rotation of the target 22, as is seen in the graphs of FIG. 3, the fundamental frequency of the third graph of FIG. 3 is therefore equal to the frequency of rotation of the target 22. Thereby, the frequency shown by the indicator 64 is the frequency of rotation of the target 22.

Referring now to FIGS. 3 and 5, there is presented a block diagram of another embodiment of the electronics unit 52 of FIG. 1, the electronics unit of FIG. 5 being identified by the legend 52B. The electronics unit 52B is seen to comprise the preamplifier 58 and the capacitor 60 which are coupled to signals on line 50, and function as described above with reference to FIG. 4. The units 52B further comprises a low pass filter 68, a limiter 70, a counter 72, a flip-flop 74, a clock 76, a counter 78, a register 80 which is strobed by the flip-flop 74 via an inverter 82, a divider 84 and indicators 86 and 88. In operation, the filter 68 filters out harmonics of the signal waveform portrayed in the third graph of FIG. 3 to provide a signal having the filtered waveform of the fourth graph of FIG. 3. The output signal of the filter is then applied to the limiter 70 which amplifies and clips the output signal of the filter 68 to provide a substantially square wave signal 90 having a format such as that of a digital signal which may be counted by the counter 72. The counter 72 counts pulses of the signal 90 modulo-M, whereupon the counter 72 resets itself and triggers the flip-flop 74. The legend M designates the number of pulses of the signal 90 to be counted between each triggering of the flip-flop 74. In view of the correspondence between the pulses of the signal 90 and that of the sinusoidal signal at the capacitor 60 it is seen that the legend M represents the number of rotations of the target 22.

The flip-flop 74 is toggled with each trigger signal from the counter 72 to provide a square wave signal 92 which alternately enables and disables the counter 78. When enabled by the flip-flop 74, the counter 78 counts clock pulses of the clock 76. At the conclusion of the enabling period as designated by the flip-flop 74, the counter 78 strobes the register 80 to read the value of the counter 78, the contents of the register 80 being proportional to the duration of the M periods of rotation of the target 22 and, hence, being proportional to the period of rotation of the target. The indicator 86 coupled to the register 80 portrays the period of rotation of the target 22. If desired, the divider 84 may be employed for dividing unity by the period T of the register 80 to provide the reciprocal of T, the reciprocal being proportional to the frequency of rotation of the target 22. The bodiment of the electronics unit 50 of FIG. 1, the embodiment of FIG. 6 being identified by the legend 52C. The unit 52C is seen to comprise the preamplifier 58 coupled to the line 50, as previously described, the unit 52C further comprising an analog-to-digital converter 100, a fast-Fourier-transformer 102, a clock 104, a register 106 having a graph 108 of a spectrum depicted within the block of the register 106, an address generator 110, a switch 112, shift registers 114, 115, and 116, comparators 118 and 120, a signature analyzer 122 which will be described with reference to FIG. 7, a gate 124, a flip-flop 125, a register 126 and an indicator 128.

In operation, the clock 104 strobes the converter 100 to provide digital samples of the analog signal applied to the converter 100 by the preamplifier 58. The strobing r.te of the converter 100 is in excess of the Nyquist rate of the harmonic frequency component of the waveform of the first graph of FIG. 3 which is desired to be utilized in analyzing the signature of the waveform by the analyzer 122. For example, assuming that the target 22 is rotating at a rate of 3,000 rotations per minute (rpm) a fifth harmonic of the wave form in the first graph of FIG. 3 occurs at a frequency of 15,000 rpm. A Nyquist sampling rate for reproducing that part of the wave form would be 30,000 samples per minute. Accordingly, the converter 100 would be strobed by the clock 104 at an exemplary rate of 48,000 samples per minute, this being equal to 800 samples per second.

In response to signals of the clock 104, the transformer 102 receives a set of signal samples from the converter 100 and performs a Fourier transformation upon the samples, as is well known, to provide a corresponding set of digital signals of which the magnitudes represent the magnitudes of the corresponding spectral lines, and wherein the addresses of the individual signals within the set of signals represents the magnitude of the frequency. Thus, with reference to the graph 108, the addresses appear on the horizontal axis to designate a specific slot, or frequency, within the set of digital signals while the vertical axis of the graph 108 represents the magnitude of each frequency term. In the event that complex digital signals are to be utilized by the transformer 102, then, as is well known, the converter 100 may include inphase and quadrature reference signals (not shown) which are mixed with the signal from the amplifier 58, the resultant signals being converted by a pair of analog-to-digital converters (not shown) to provide inphase and quadrature digital signals of a complex digital signal.

The address generator 110, in response to pulses from the clock 104, sequentially addresses the switch 112 to select individual output lines 130 of the register 106 in order of increasing frequency, wherein each of the lines 130 corresponds to a slot of the register 106. Thereby, there appears on line 132 a succession of digital signals representing the amplitude individual ones of the spectral lines portrayed in the spectrum of the graph 108. The line 132 couples the spectral components to the shift register 114 and the comparator 118. Spectral components from the output terminal of the shift register 114 are coupled via line 133 to the analyzer 122. The input and output terminals of the register 114 are labeled A and B. The shift register 114 shifts each signal from terminal A to terminal B so that the previously addressed spectral line appears at terminal B while the presently addressed spectral line appears at terminal A. Thereby, the comparator 118 can compare the magnitude of the presently addressed spectral line with the previously addressed spectral line to determine which of the spectral lines is greater.

With reference to the graph 108, it is seen that many frequency terms in the typical spectrum are of zero value, with non-zero values appearing in the vicinity of the fundamental line and harmonics thereof. It is noted that the amplitude of the fundamental line is larger than the magnitudes of the lines along side the fundamental line. When the signal at terminal A is less than the signal at terminal B, the previous signal at terminal B represents the fundamental frequency and the present signal at terminal A is the spectral line immediately to the right of the fundamental frequency. Accordingly, when the comparator 118 detects that the signal at terminal A is less than the signal at terminal B, the comparator 118 strobes the gate 124 via flip-flop 125 to pass the address of the previous signal to line 134. The shift register 115 functions in the same manner as does the shift register 114 so that the address from the generator 110 coupled via the shift register 115 corresponds to the spectral line at terminal B of the shift register 114. Accordingly, the signal on line 134 is the frequency slot of the graph 108 corresponding to the fundamental frequency.

The shift register 116 and the comparator 120 provide the function of determining whether the target 22 is rotating at a constant speed, or whether the target 22 is still undergoing acceleration to reach its desired speed of rotation. For example, at relatively low rates of rotation, the spectrum of the graph 108 shifts to the left as the slot addresses are scaled in accordance with the speed or rotation. Thus, in the event that the target is rotating at only one-half the desired speed, the fundamental line of the spectrum 108 is found at a slot location having an address only one-half the address shown in the graph 108. The slot addresses of the harmonic frequencies are similarly scaled.

With respect to the terminals A and B of the shift register 116, the operation thereof is the same as that previously described with reference to the shift register 114 so that the frequency component at terminal B of the shift register 116 immediately precedes the next frequency component coupled by the gate 124. The flip-flop 125 is reset by the clock 104 at the beginning of each measurement interval so that the gate 124 is strobed only once during each measurement interval. For a constant value of rotation, the two frequency components have the same slot address in the graph 108 and, accordingly, the comparator 120 strobes the register 126 to read the address, or value, of the frequency component. The value of frequency in the register 126 is presented as the speed of rotation of the target 22 on the indicator 128. If desired, a read-only memory 136 and a comparator 138 may be coupled between the register 126 and the indicator 128 for providing a further indication that the frequency of rotation is a correct value of rotation. The memory 136 stores one or more desired values of rotation which are then compared by the comparator 138 to the actual value of rotation as obtained from the register 126 for signaling the indicator 128 to display that the rate of rotation is correct.

Figure 7:
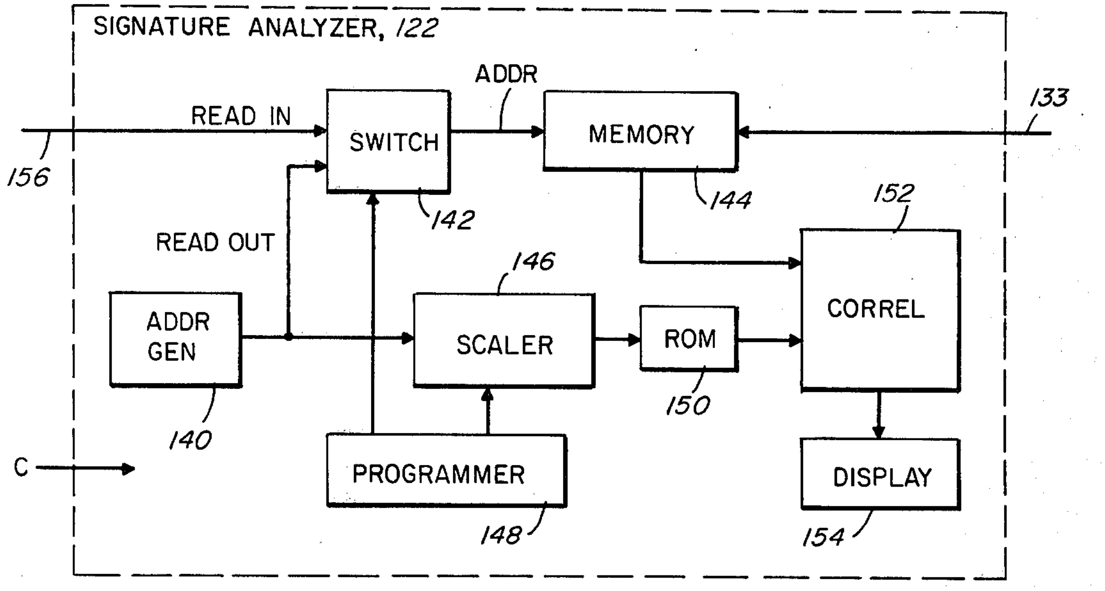
FIG. 7 is a block diagram of the signature analyzer of FIG. 6.

Referring now to FIG. 7, the signature analyzer 122 of FIG. 6 is seen to comprise an address generator 140, a selector switch 142, a memory 144, a scaler 146, a programmer 148, a memory 150, a correlator 152 and a display 154. One input terminal of the switch 142 is coupled via line 156 to the shift register 115 of FIG. 6, and an input terminal of the memory 144 is coupled via the line 133 to the shift register 114 of FIG. 6.

Figure 8:
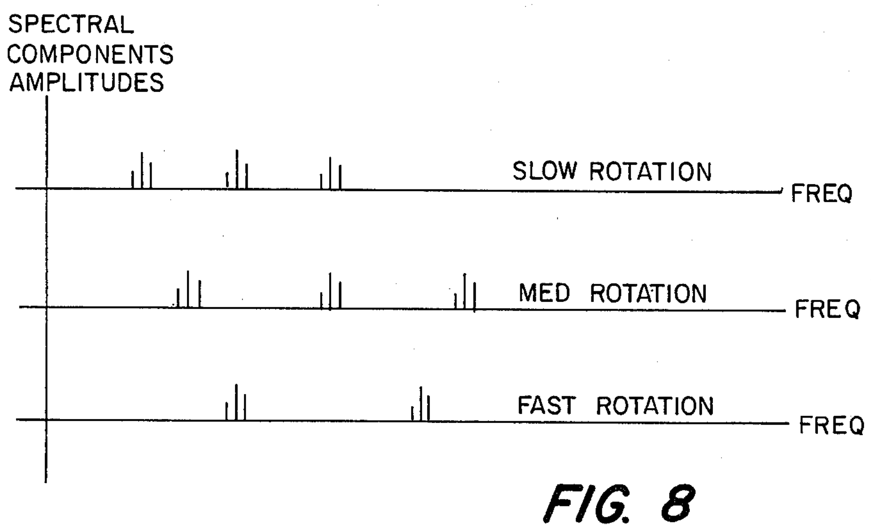
FIG. 8 is a set of graphs depicting the scaling of the spectrum as a function of the rotation of the target.

Referring also to FIG. 8, the analyzer 122 of FIG. 7 is seen to operate as follows. The programmer 148, in response to clock pulses at terminal C from the clock 104 of FIG. 6 operates both the switch 142 and the scaler 146. The slot address on line 156 is initially coupled via the switch 142 for addressing the memory 144 for storing data of the spectrum stored in the register 106 and portrayed in the graph 108 of FIG. 6. The spectral data is coupled from the register 106, via the switch 112, the shift register 114, and the line 133 to the memory 144. Since the address on line 156 corresponds to the frequency component on line 133, the memory 144 stores the same data found in the register 106. After all the data of the register 106 has been read into the memory 144, the programmer 148 directs the switch 142 to the address generator 140 for reading the data out of the memory 144 into the correlator 152. In addition, the address of the generator 144 is applied via a scaler 146 to the memory 150 for reading out data from the memory 150 into the correlator 152. The memory 150 is a read-only memory for storing the spectral lines of an exemplary spectrum of the rotation of a target such as the target 22.

It is noted that the spectrum of the target rotation is a function of the speed of rotation. As shown in the three graphs of FIG. 8, the spectrum is compressed towards the left for relatively slow values of rotation, the spacings between the spectral lines becoming expanded for faster values of rotation. Accordingly, in order to correlate the exemplary spectrum of the memory 150 with the measured spectrum of the memory 144, the locations of the frequency components, as designated by the slot address in the graph 108 of FIG. 6, need be scaled to compensate for the rate of rotation of the target 22 as has been explained with reference to FIG. 8. Accordingly, the programmer 148 introduces scale factors into the scaler 146 for scaling the slot addresses of the exemplary spectrum. For each scale factor, a new correlation is performed by the correlator 152. The best value of the correlation, this corresponding to the best match between the exemplary spectrum and the measured spectrum, is presented on the display 154. Thereby, the analyzer 122 presents a comparison of the measured spectrum with an exemplary spectrum whereby an operator of the source 20 of FIG. 1 can determine that the source 20 is functioning properly.

It is understood that the above described embodiments of the invention are illustrative only and that modifications thereof may occur to those skilled in the art. Accordingly, it is desired that this invention is not to be limited to the embodiments disclosed herein but is to be limited only as defined by the appended claims.

What is claimed is:

1. A monitor for the target of an X-ray source comprising:

X-ray detection means located for viewing said target along a tangent line to a radiating surface of said target, said detection means providing a signal in response to radiation incident upon said detection means;

means coupled to said detection means for measuring a frequency of an undulation in said signal resulting from a rotation of said target.

2. A monitor according to claim 1 wherein said detection means includes means for positioning a detector of said detection means outside an X-ray transmitting port of said housing.

3. A monitor according to claim 1 wherein said detection means includes a scintillator, means for converting scintillations of said scintillator into said signals, and means for isolating said converting means from radiation emanating from said target.

4. A monitor according to claim 3 wherein said isolating means includes a light conduit for coupling scintillations to said converting means, and means for positioning said converting means at a distance from an X-ray transmitting port of said housing.

5. A monitor according to claim 1 wherein said measuring means includes a frequency discriminator coupled to said signal for providing a measure of said frequency.

6. A monitor according to claim 5 wherein said measuring means further includes switching means activated by said discriminator for controlling the power applied between a cathode of said source and said target.

7. A monitor according to claim 1 wherein said measuring means includes means for counting clock signals during a predesignated number of periods of said undulations to provide the duration of one of said periods.

8. A monitor according to claim 1 wherein said measuring means includes a fourier transformer for providing a spectrum of said signal, and means for selecting the fundamental frequency of said spectrum.

9. A monitor according to claim 8 wherein said measuring means further includes means responsive to said spectrum for analyzing the signature of said spectrum.

10. A monitor according to claim 9 wherein said signature analyzer includes a memory for storing a reference spectrum and means for correlating said first mentioned spectrum with said reference spectrum.

11. A monitor according to claim 10 wherein said signature analyzer further comprises a memory for storing said first mentioned spectrum, and means coupled to one of said memories for scaling an address thereto to equalize the scale of said first mentioned spectrum with the scale of said reference spectrum, thereby compensating for the speed of rotation of said target.

12. A radiation monitor for a source of X-radiation having a rotatable target comprising:

means for sighting along an X-ray radiating surface of said target, said sighting means including means responsive to said X-radiation for signaling the presence of said X-radiation;

means coupled to said sighting means and shielded from said X-radiation for providing an electrical signal proportional to the intensity of said X-radiation; and means coupled to said signal providing means for measuring a frequency component of said signal equal to a rate of rotation of said target.

13. A radiation monitor for a source of X-radiation having a rotatable target comprising:

means aligned with a tangent to an X-ray radiating surface of said target for viewing X-radiation emitted generally in a direction of said tangent, said viewing means being located externally to a housing of said source; and means coupled to said viewing means and responsive to variations in the intensity of said X-radiation as viewed by said viewing means for measuring a frequency component of said variations equal to the speed of rotation of said target.

14. A monitor for the target of an X-ray source comprising:

X-ray detection means located for viewing said target and providing a signal in response to X-radiation incident upon said detection means; and means coupled to said detection means for measuring a frequency of an undulation in said signal related to the rotation of said target.

15. An X-radiation monitor comprising:

a rotatable target having an X-radiation emitting surface;

electron source means for directing electrons onto said surface and producing X-radiation from said surface;

detector means responsive to said X-radiation from said surface for producing an electrical signal related to the intensity of said X-radiation; and means coupled to said detector means for measuring a frequency component of said electrical signal.

16. An X-radiation monitor as set forth in claim 15 wherein said frequency component of said electrical signal is related to the rotation frequency of said target.

* * * * *